(12) United States Patent
Peng et al.

(10) Patent No.: US 12,550,824 B2
(45) Date of Patent: Feb. 17, 2026

(54) PARKING MECHANISM OF RIDING LAWN MOWER AND RIDING LAWN MOWER

(71) Applicant: NINGBO LINGYUE INTELLIGENT EQUIPMENT CO., LTD, Ningbo (CN)

(72) Inventors: Shulin Peng, Ningbo (CN); Baijun Tong, Ningbo (CN); Shengqiu Zhu, Ningbo (CN); Chaojie Tao, Ningbo (CN); Shuochi Huang, Ningbo (CN); Xiaobo Ye, Ningbo (CN)

(73) Assignee: NINGBO LINGYUE INTELLIGENT EQUIPMENT CO.,LTD, Ningbo (CN)

( * ) Notice: Subject to any disclaimer, the term of this patent is extended or adjusted under 35 U.S.C. 154(b) by 667 days.

(21) Appl. No.: 17/975,564

(22) Filed: Oct. 27, 2022

(65) Prior Publication Data
US 2024/0049624 A1  Feb. 15, 2024

(30) Foreign Application Priority Data

Aug. 12, 2022  (CN) .......................... 202210971554.0
Aug. 12, 2022  (CN) .......................... 202222133203.0

(51) Int. Cl.
*A01D 69/10*   (2006.01)
*A01D 34/00*   (2006.01)
*A01D 101/00*  (2006.01)

(52) U.S. Cl.
CPC ........... *A01D 69/10* (2013.01); *A01D 34/001* (2013.01); *A01D 2101/00* (2013.01)

(58) Field of Classification Search
CPC .. A01D 75/28; A01D 75/285; A01D 2101/00; A01D 69/10; A01D 34/00;
(Continued)

(56) References Cited

U.S. PATENT DOCUMENTS 4,600,075 A * 7/1986 Heidner ................. A01D 34/64
                                                180/336
5,238,267 A * 8/1993 Hutchison ............ B62D 29/046
                                                180/312
(Continued)

FOREIGN PATENT DOCUMENTS

CN    109552283 A  *  4/2019  ................ B60T 7/06
DE  102013018038 A1 *  6/2015  ............. F16H 61/47
(Continued)

*Primary Examiner* — Adam J Behrens
(74) *Attorney, Agent, or Firm* — LANWAY IPR SERVICES; Chun-Ming Shih

(57) ABSTRACT

A parking mechanism of a riding lawn mower includes a trigger assembly, a pull rod assembly, a pedal brake assembly, a connecting rod and a gearbox. When the pedal part is stepped down, it is capable of driving the connecting rod clamping plate, the connecting rod and the disc brake mechanism of the gearbox in sequence to make the gearbox in a shutdown state, and at the same time, is capable of driving a parking lower clamping plate to rotate to the clamping position; when the pedal part is stepped down, the trigger paddle in the parking position is capable of rotating to the non-parking position, which is capable of driving the parking pull rod to pull the parking upper clamping plate to rotate to be separated from the parking lower clamping plate in the clamping position.

9 Claims, 2 Drawing Sheets

(58) Field of Classification Search
CPC ...... A01D 34/001; A01D 34/62; A01D 34/64;
A01D 34/66; A01D 34/6812; A01D
34/69; A01D 34/82; A01D 34/828; A01D
2034/6843
See application file for complete search history.

(56) References Cited

U.S. PATENT DOCUMENTS

| | | | | |
|---|---|---|---|---|
| 6,199,354 B1 * | 3/2001 | King | A01D 34/6812 | 56/11.4 |
| 6,301,864 B1 * | 10/2001 | Damie | A01D 34/6812 | 56/11.3 |
| 6,434,917 B1 * | 8/2002 | Bartel | A01D 34/64 | 56/14.7 |
| 6,708,805 B2 * | 3/2004 | Samejima | B62D 11/183 | 180/6.34 |
| 7,299,610 B2 * | 11/2007 | Piontek | A01D 69/10 | 180/315 |
| 7,562,515 B2 * | 7/2009 | Komorida | A01D 34/661 | 56/14.9 |
| 7,686,108 B2 * | 3/2010 | Piontek | A01D 69/10 | 180/6.48 |
| 7,798,939 B2 * | 9/2010 | Musat | B60T 7/104 | 477/92 |
| 7,954,907 B1 * | 6/2011 | Wieber | A01D 69/10 | 188/106 P |
| 10,045,485 B2 * | 8/2018 | Burns | B62D 11/006 | |
| 11,554,759 B2 * | 1/2023 | Schoonmaker | B60T 7/102 | |
| 2003/0046915 A1 * | 3/2003 | Samejima | B62D 11/08 | 56/14.9 |
| 2004/0000130 A1 * | 1/2004 | Bartel | A01D 34/69 | 56/11.3 |
| 2006/0172857 A1 * | 8/2006 | Eavenson, Sr. | B62D 11/006 | 477/203 |
| 2007/0078582 A1 * | 4/2007 | Musat | B60T 7/104 | 701/70 |
| 2007/0169456 A1 * | 7/2007 | Komorida | A01D 34/74 | 56/17.1 |
| 2008/0296107 A1 * | 12/2008 | Porter | A01D 34/82 | 188/2 D |
| 2009/0044506 A1 * | 2/2009 | Nunez | A01D 34/64 | 56/11.3 |
| 2013/0047568 A1 * | 2/2013 | Yamada | A01D 69/10 | 56/14.7 |
| 2017/0247021 A1 * | 8/2017 | Krystowski | B60T 7/104 | |
| 2020/0269917 A1 * | 8/2020 | Welz | A01D 34/824 | |
| 2021/0309189 A1 * | 10/2021 | Funk | F16H 21/50 | |
| 2022/0201931 A1 * | 6/2022 | Ding | B60T 7/045 | |
| 2023/0071515 A1 * | 3/2023 | Funk | A01D 34/6812 | |
| 2023/0371423 A1 * | 11/2023 | Iida | B60T 7/06 | |

FOREIGN PATENT DOCUMENTS

| | | | | |
|---|---|---|---|---|
| DE | 102018108796 A1 * | 10/2019 | ........... | A01D 34/824 |
| WO | WO-2023215714 A1 * | 11/2023 | ........... | A01D 34/824 |

* cited by examiner

PARKING MECHANISM OF RIDING LAWN MOWER AND RIDING LAWN MOWER

TECHNICAL FIELD

The present disclosure relates to the technical field of lawn mowers, in particular to a parking mechanism of a riding lawn mower and a riding lawn mower.

BACKGROUND

A riding lawn mower, which is also referred to as a riding lawn machine, is a large mechanical tool for mowing lawns and vegetation and is widely used in real life. The application of a lawn mower not only saves a lot of labor time, but also makes the lawn more beautiful after being mowed, which is a very practical mechanical tool.

Generally, a lawn mower consists of a chassis, a blade, a power assembly (gasoline, a motor), a travelling mechanism (a mechanical bridge, a hydraulic bridge, CVT), a steering mechanism, a lawn discharging mechanism and a parking mechanism. The parking mechanism is a parking, storing and locking mechanism with a riding garden tool, which is convenient for an operator to control the parking and braking of the whole mower. A handrail of the lawn mower is designed with a lever which is convenient for an operator to control. The lawn mower relies on the operator to ride on tools, controls walking on the ground by hands and feet, has a self-driving function, and achieves the function that a gearbox drives wheels to move forward. The operator only needs to turn a steering wheel, an accelerator pedal, a brake pedal and a parking mechanism.

However, the operator of the riding garden tool usually uses a plurality of mechanical switches to control the parking and braking of the mower. The operation structure is complicated, which is inconvenient to use quickly. It is not easy to operate and use flexibly. In view of the above problems, it is necessary to provide a parking mechanism which is convenient to operate and meets the needs of different people.

The applicant finds that the prior art has at least the following technical problems.

The existing parking mechanism is complicated in mechanical structure and is not easy to operate.

SUMMARY

The purpose of the present disclosure is to provide a parking mechanism of a riding lawn mower, so as to solve the technical problem in the prior art that the parking mechanism of the riding lawn mower is complicated in structure and difficult to operate. Many technical effects that can be produced by the preferred technical scheme among the technical schemes provided by the present disclosure are described in detail in the following description.

In order to achieve the above purpose, the present disclosure provides the following technical schemes.

The present disclosure provides a parking mechanism of a riding lawn mower, comprising a trigger assembly, a pull rod assembly, a pedal brake assembly, a connecting rod and a gearbox, wherein:

the trigger assembly comprises a parking trigger which is rotatable around a rotating shaft, a trigger paddle is provided on the parking trigger; the pull rod assembly comprises a parking pull rod and a parking upper clamping plate; the pedal brake assembly comprises a pedal lever and a pedal part provided at the end of the pedal lever, and a parking lower clamping plate and a connecting rod clamping plate are provided on the pedal lever;

the upper end and the lower end of the parking pull rod are connected with the parking trigger and the parking upper clamping plate, respectively; the front end and the rear end of the connecting rod are connected with the connecting rod clamping plate and the disc brake mechanism of the gearbox, respectively;

a pedal part is stepped down, which is capable of driving the connecting rod clamping plate to rotate forward, pulling the connecting rod forward, pulling the disc brake mechanism of the gearbox, and making the gearbox in a shutdown state in sequence, and at the same time, is capable of driving the parking lower clamping plate to rotate to the clamping position;

the trigger paddle is rotatable from the non-parking position to the parking position, and is capable of driving the parking pull rod to pull the parking upper clamping plate to rotate to be engaged with the parking lower clamping plate in the clamping position;

when the pedal part is stepped down, the trigger paddle in the parking position rotates to the non-parking position, which is capable of driving the parking pull rod to pull the parking upper clamping plate to rotate to be separated from the parking lower clamping plate in the clamping position.

Further, there are two parking positions, including a first parking position and a second parking position, wherein the first parking position is located below the non-parking position, and the second parking position is located above the non-parking position.

Further, the parking trigger is provided with a first fixing ring and a second fixing ring in the circumferential direction, the parking pull rod comprises a first pull rod and a second pull rod with different lengths; when the parking position is the first parking position, the parking pull rod is the first pull rod, the upper end of the first pull rod is inserted into the first fixing ring, the lower end of the first pull rod is connected with the parking upper clamping plate; when the parking position is the second parking position, the parking pull rod is the second pull rod, the upper end of the second pull rod is inserted into the second fixing ring, and the lower end of the second pull rod is connected with the parking upper clamping plate.

Further, the length of the first pull rod is longer than that of the second pull rod.

Further, the parking trigger comprises an arc-shaped outer guard plate, an inner ring and a connecting strip provided between the concave surface of the outer guard plate and the inner ring, the inner ring is capable of being sleeved on the rotating shaft, and the trigger paddle is provided on the convex surface of the outer guard plate.

Further, the first fixing ring is provided on the connecting strip.

Further, a supporting strip is further provided on the inner ring at the position opposite to the connecting strip, and the second fixing ring is provided on the supporting strip.

Further, the trigger assembly further comprises a parking toothed plate, the parking toothed plate comprises a side plate and a horizontal tube perpendicular to the side plate, the horizontal tube is the rotating shaft of the parking trigger, the inner ring is sleeved on the horizontal tube, and a damping ring is provided between the inner ring and the horizontal tube.

Further, the parking mechanism of the riding lawn mower further comprises a trigger assembly mounting frame, the parking toothed plate is fixed on the trigger assembly mounting frame, and the parking trigger is rotatably connected with the parking toothed plate.

Further, the trigger assembly mounting frame is provided with a mounting groove, and the parking trigger and the parking toothed plate are provided in the mounting groove.

The present disclosure further provides a riding lawn mower, comprise the parking mechanism of the riding lawn mower.

The parking mechanism of the riding lawn mower and the riding lawn mower according to the present disclosure have the following beneficial effects.

The parking mechanism of the riding lawn mower according to the present disclosure is a mechanical parking mechanism applied to the riding garden tool. The parking mechanism has a simple structure and is convenient and quick to operate for drivers driving a riding lawn mower. When braking, the pedal part of the pedal lever is stepped down to make the gearbox in a shutdown state, so as to achieve the purpose of parking. Then, the parking trigger is pulled from the neutral position to the parking position, so that the parking upper clamping plate can be engaged with the parking lower clamping plate to achieve the parking state. At this time, due to the pulling effect of the disc brake mechanism of the gearbox on the connecting rod and the connecting rod clamping plate, the parking lower clamping plate keeps the trend of backward rotation and is engaged and locked with the parking upper clamping plate, and the hands and feet of a driver leave the parking trigger and the pedal lever without affecting the parking state. When the parking state needs to be released, the parking brake can be released only by completing the two steps of stepping down the pedal part and pulling the parking trigger from the parking position to the neutral position. It is safe and reliable, and the mower will not slide due to mis-operation of releasing the parking state because of touch by mistake.

The riding lawn mower with the parking mechanism is convenient to operate in braking and parking, safe and reliable.

BRIEF DESCRIPTION OF THE DRAWINGS

In order to explain the embodiments of the present disclosure or the technical schemes in the prior art more clearly, the drawings that need to be used in the description of the embodiments or the prior art will be briefly introduced hereinafter. Obviously, the drawings in the following description are only some embodiments of the present disclosure. For those skilled in the art, other drawings can be obtained according to these drawings without any creative effort.

Figure 1:
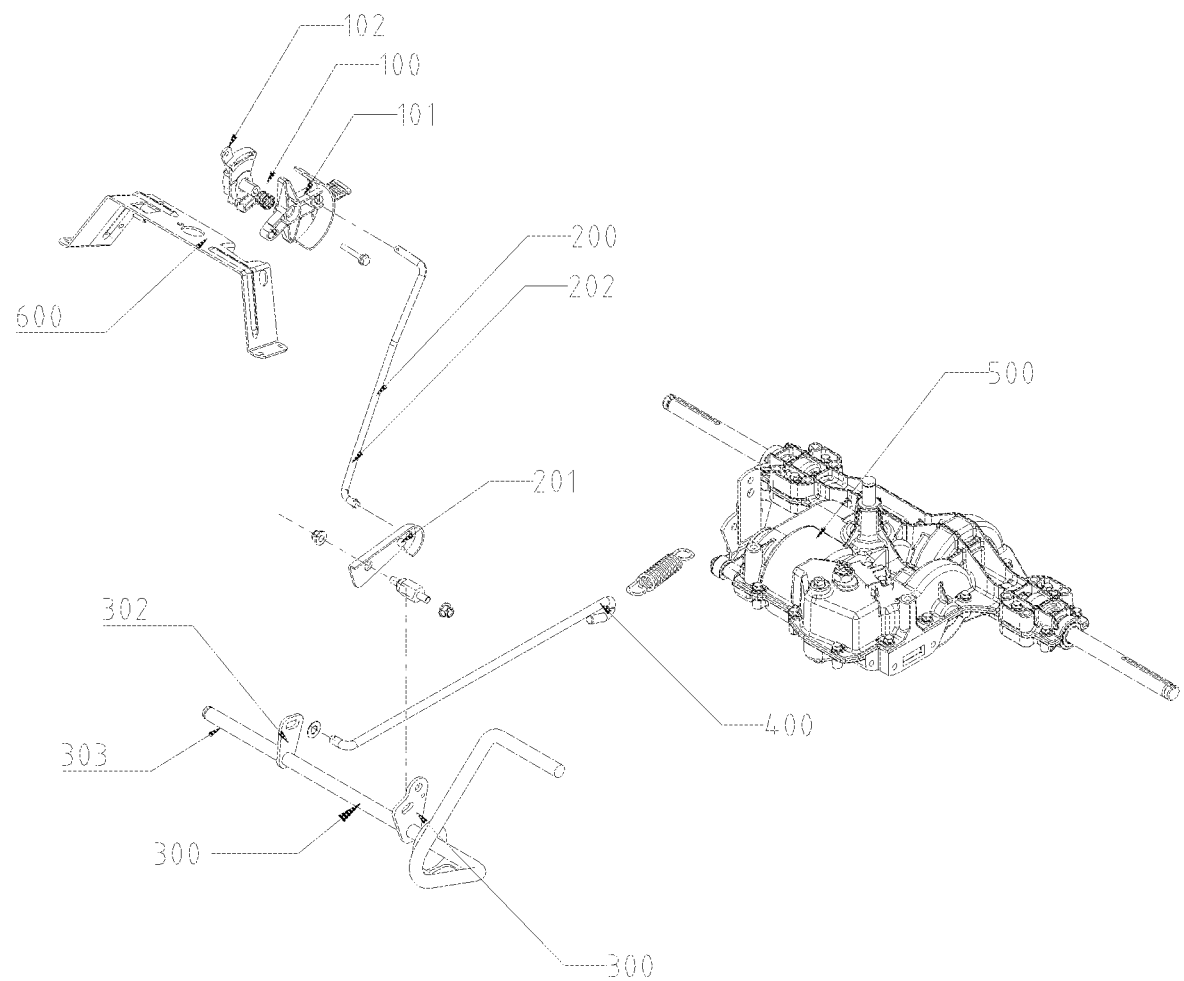
FIG. 1 is an exploded diagram of a parking mechanism of a riding lawn mower according to the present disclosure (only one parking pull rod is shown in the figure).
Figure 2:
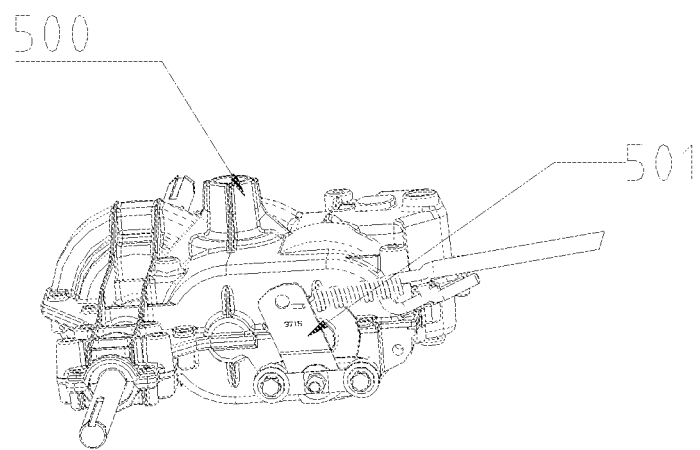
FIG. 2 is a schematic diagram of a gearbox and a disc brake mechanism thereof according to the present disclosure.
Figure 3:
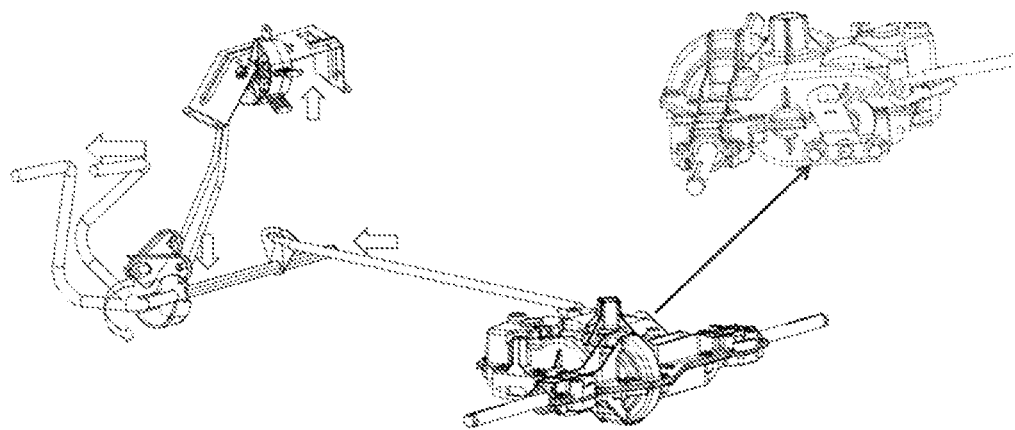
FIG. 3 is a schematic diagram of the braking and parking state of a parking mechanism of a riding lawn mower according to the present disclosure.

In the figures: 100, trigger assembly; 101, parking trigger; 1011, trigger paddle; 1012, first fixing ring; 1013, second fixing ring; 102, parking toothed plate; 200, pull rod assembly; 201, parking upper clamping plate; 202, parking pull rod; 300, pedal brake assembly; 301, parking lower clamping plate; 302, connecting rod clamping plate; 303, pedal lever; 400, connecting rod; 500, gearbox; 501, disc brake mechanism; 600, trigger assembly mounting frame.

DETAILED DESCRIPTION OF THE EMBODIMENTS

In order to make the object, technical scheme and advantages of the present disclosure clearer, the technical scheme of the present disclosure will be described in detail hereinafter. Obviously, the described embodiments are only part of the embodiments of the present disclosure, rather than all of the embodiments. Based on the embodiment of the present disclosure, all other embodiments obtained by those skilled in the art without any creative effort belong to the scope of protection of the present disclosure.

Embodiment 1

As shown in FIGS. 1-4, the present disclosure provides a parking mechanism of a riding lawn mower, which comprises a trigger assembly 100, a pull rod assembly 200, a pedal brake assembly 300, a connecting rod 400 and a gearbox 500, wherein:

The trigger assembly 100 comprises a parking trigger 101 which is rotatable around a rotating shaft, a trigger paddle 1011 is provided on the parking trigger 101 in the circumferential direction; the pull rod assembly 200 comprises a parking pull rod 202 and a parking upper clamping plate 201; the pedal brake assembly 300 comprises a pedal lever 303 and a pedal part provided at the end of the pedal lever, and a parking lower clamping plate 301 and a connecting rod clamping plate 302 are provided on the pedal lever 303.

As shown in FIG. 1, the upper end and the lower end of the parking pull rod 202 are connected with the parking trigger 100 and the free ends of the parking upper clamping plate 201, respectively. The other end of the parking upper clamping plate 201 is rotatably connected with the rotating shaft fixedly provided on the body of the lawn mower. The front end and the rear end of the connecting rod 400 are connected with the connecting rod clamping plate 302 and the disc brake mechanism 501 of the gearbox 500, respectively.

When the driver makes a braking action, a pedal part is stepped down to drive the connecting rod clamping plate 302 to rotate forward, pull the connecting rod 400 forward, pull the disc brake mechanism 501 of the gearbox 500, and make the gearbox 500 in a shutdown state in sequence, thus achieving the purpose of parking; and at the same time, the parking lower clamping plate 301 is driven to rotate forward to rotate to the clamping position.

The parking trigger 101 is rotatable around its rotating shaft, and the trigger paddle 1011 provided in the circumferential direction of the parking trigger is also rotatable to the corresponding parking position and non-parking position, respectively; the position of the trigger paddle is close to the horizontal plane in the non-parking position; and the position of the trigger paddle rotates to be above or below the horizontal plane in the parking position.

If parking is required after braking, the trigger paddle 1011 needs to be rotated from the non-parking position to the parking position. At this time, the parking trigger 101 is driven to rotate around the rotating shaft, and the parking pull rod 202 is driven to pull the free end of the parking upper clamping plate 201 to rotate to be engaged with the parking lower clamping plate 301 in the clamping position.

At this time, due to the pulling effect of the disc brake mechanism 501 of the gearbox 500 on the connecting rod 400 and the connecting rod clamping plate 302, the parking lower clamping plate 301 keeps the trend of backward rotation and is engaged and locked with the parking upper clamping plate 201, and the hands and feet of a driver leave the parking trigger and the pedal lever 303 without affecting the parking state.

On the contrary, in order to release the parking state, it is necessary to step down the pedal first. At this time, the trigger paddle 1011 in the parking position is rotated to the non-parking position, so that the parking pull rod pulls the parking upper clamping plate to rotate to be separated from the parking lower clamping plate in the clamping position. The parking brake is released only by completing the two steps of stepping down the pedal part and pulling the parking trigger from the parking position to the non-parking position. The disc brake mechanism 501 on the gearbox 500 has been already released from being braked. The parking brake can only be released after the pedal lever 303 is released. It is safe and reliable, and the mower will not slide due to mis-operation of releasing the parking state because of touch by mistake.

Embodiment 2

As an alternative embodiment, there are two parking positions, including a first parking position and a second parking position. The first parking position is located below the non-parking position, and the second parking position is located above the non-parking position.

Some drivers riding lawn mowers are used to pulling the trigger paddle upward, while others are used to pulling the trigger paddle downward. If the parking position is set to be inconsistent with the operating habits of the drivers, it will easily lead to mis-operation so as to affect the parking operation. The riding parking mechanism of the present disclosure is provided with two alternative parking positions, that is, the trigger paddle can be pulled upward and downward to realize the parking state of the riding lawn mower. The driver can choose to set the parking position according to his/her own habits and demands, so that it is convenient for the operator to control when using the riding garden tools to park.

Embodiment 3

As shown in FIG. 1, as an alternative embodiment, the parking trigger 100 is provided with a first fixing ring 1012 and a second fixing ring 1013 in the circumferential direction. The parking pull rod 202 comprises a first pull rod and a second pull rod which are alternative. The first pull rod and the second pull rod have different lengths, and one of the first pull rod and the second pull rod should be selected when in use. When the first pull rod is selected, the upper end of the first pull rod is inserted into the first fixing ring 1012, and the lower end of the first pull rod is connected with the parking upper clamping plate 201. At this time, the parking position is the first parking position, and the driver can switch to the parking state by pulling the trigger paddle 1011 downward to the first parking position. When the second pull rod is selected as the parking pull rod, the upper end of the second pull rod is inserted into the second fixing ring 1013, and the lower end of the second pull rod is connected with the parking upper clamping plate 201. At this time, the parking position is the second parking position, and the driver can switch to the parking state by pulling the trigger paddle 1011 upward to the second parking position.

According to the different parking positions preferred by the driver, the first pull rod or the second pull rod with different lengths is selected. The upper end of the selected parking pull rod 202 is inserted into the fixing ring in the circumferential direction at the opposite position of the parking trigger 100, so that the trigger paddle can be pulled downward to the first parking position or can be pulled upward to the second parking position to achieve the parking state.

Embodiment 4

As shown in FIG. 1, the length of the first pull rod is greater than that of the second pull rod.

When the parking pull rod 202 is a longer first pull rod, the upper end thereof is fixed by the first fixing ring 1012, and a rotating force arm is relatively lengthened, so that the trigger paddle 1011 can be pulled downward to achieve the parking state.

When the parking pull rod 202 is a shorter second pull rod, the upper end thereof is fixed by the second fixing ring 1013, and a rotation force arm is relatively shortened, so that the trigger paddle 1011 can be pulled upward to achieve the parking state.

Embodiment 5

Figure 4:
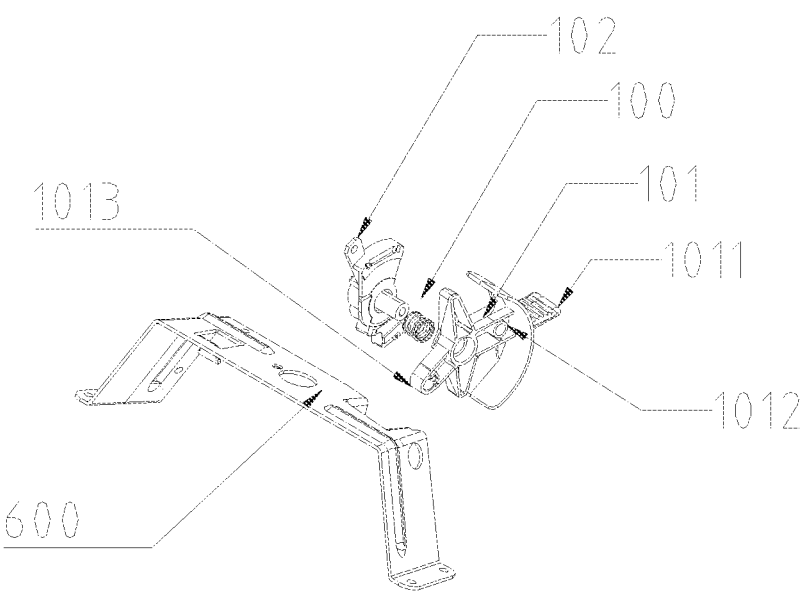
FIG. 4 is a schematic diagram of a trigger assembly and a trigger assembly mounting frame according to the present disclosure.

As shown in FIG. 4, the parking trigger 101 comprises an arc-shaped outer guard plate, an inner ring and a connecting strip provided between the concave surface of the outer guard plate and the inner ring, the inner ring is capable of being sleeved on the rotating shaft, and the trigger paddle is provided on the convex surface of the outer guard plate.

The parking trigger 101 has a simple structure and can be driven by the trigger paddle 1011 to rotate around the rotating shaft thereof.

Embodiment 6

As shown in FIG. 4, the first fixing ring 1012 is provided on the connecting strip.

The first fixing ring 1012 is provided in the middle of two connecting strips near the outer guard plate, and the position of the trigger paddle 1011 on the convex surface of the outer guard plate corresponds to the position of the first fixing ring 1012.

Embodiment 7

As shown in FIG. 4, a supporting strip is further provided on the inner ring at the position opposite to the connecting strip, and the second fixing ring 1013 is provided on the supporting strip.

The second fixing ring 1013 is provided at the opposite position of the first fixing ring 1012, so that the first parking positions and the second parking positions which are at the upper part and the lower part are staggered by a relatively large angle. As shown in FIG. 4, the supporting strip is U-shaped, the inner ring is connected with both ends of the U-shaped supporting strip, and the second fixing ring 1013 is provided at the bottom of the U-shaped supporting strip.

Embodiment 8

As shown in FIG. 4, the trigger assembly 100 further comprises a parking toothed plate 102. The parking toothed plate 102 comprises a side plate and a horizontal tube perpendicular to the side plate. The horizontal tube is the rotating shaft of the parking trigger. The inner ring is sleeved on the horizontal tube, and a damping ring is provided between the inner ring and the horizontal tube.

A damping ring is provided between the inner ring of the parking trigger and the horizontal tube of the parking toothed plate 102 to prevent the inner ring and the horizontal tube from easily rotating relatively since the parking trigger is touched by mistake.

Embodiment 9

As shown in FIG. 4, the parking mechanism further comprises a trigger assembly mounting frame 600. The parking toothed plate 102 is fixed on the trigger assembly mounting frame 600. The parking trigger is rotatably connected with the parking toothed plate 102.

The trigger assembly mounting frame 600 is a door-shaped frame, which is fixedly mounted at the right position of the cab of the riding lawn mower, and is convenient for the driver to operate with his/her right hand. On the contrary, the pedal part is provided at the left end of the pedal lever 303, which is convenient for the driver to operate with his/her left foot.

The trigger assembly mounting frame 600 is provided with a mounting groove, and the parking trigger and the parking toothed plate 102 are provided in the mounting groove.

The horizontal tube of the parking toothed plate 102 is provided with internal threads. The screws pass through the side wall at one side of the mounting groove, and are in threaded connection with the horizontal tube, so that the parking toothed plate 102 can be fixed in the mounting groove. The parking trigger 101 is sleeved on the parking toothed plate 102 and rotates with respect to the parking toothed plate.

Embodiment 10

The present disclosure further provides a riding lawn mower with the parking mechanism, which is convenient to operate in braking and parking, safe and reliable.

The above only describes the specific embodiments of the present disclosure, but the scope of protection of the present disclosure is not limited thereto. Any changes or substitutions conceivable to those skilled in the art within the technical scope disclosed by the present disclosure should be covered within the scope of protection of the present disclosure. Therefore, the scope of protection of the present disclosure should be based on the scope of protection of the claims.

In the description of the present disclosure, it should be noted that, unless otherwise stated, "a plurality of" means two or more; the orientational or positional relationships indicated by the terms such as "up", "down", "left", "right", "inside", "outside", "front end", "back end", "head" and "tail" are based on the orientational or positional relationships shown in the drawings only for the convenience of describing the present disclosure and simplifying the description, rather than indicate or imply that the referred devices or elements must have a specific orientation, be constructed and operated in a specific orientation, and therefore should not be construed as limiting the present disclosure. In addition, the terms such as "first", "second" and "third" are only used for the purpose of description, and cannot be understood as indicating or implying relative importance.

In the description of the present disclosure, it should also be noted that unless otherwise specified and defined expressly, the terms such as "mount", "link" and "connect" should be understood broadly, for example, it can be fixed connection, detachable connection or integral connection; or mechanical connection or electrical connection; or direct connection or indirect connection through an intermediate medium. For those skilled in the art, the specific meanings of the above terms in the present disclosure can be understood according to specific situations.

What is claimed is:

1. A parking mechanism of a riding lawn mower, comprising a trigger assembly, a pull rod assembly, a pedal brake assembly, a connecting rod and a gearbox, wherein:
   the trigger assembly comprises a parking trigger which is rotatable around a rotating shaft, a trigger paddle is provided on the parking trigger; the pull rod assembly comprises a parking pull rod and a parking upper clamping plate; the pedal brake assembly comprises a pedal lever and a pedal part provided at the end of the pedal lever, and a parking lower clamping plate and a connecting rod clamping plate are provided on the pedal lever;
   an upper end and a lower end of the parking pull rod are connected with the parking trigger and the parking upper clamping plate, respectively; a front end and a rear end of the connecting rod are connected with the connecting rod clamping plate and a disc brake mechanism of the gearbox, respectively;
   when the pedal part is stepped down, it is capable of driving the connecting rod clamping plate to rotate forward, pulling the connecting rod forward, pulling the disc brake mechanism of the gearbox, and placing the gearbox in a shutdown state in sequence, and at the same time, is capable of driving the parking lower clamping plate to rotate to a clamping position;
   the trigger paddle is rotatable from a non-parking position to a parking position, and is capable of driving the parking pull rod to pull the parking upper clamping plate to rotate to be engaged with the parking lower clamping plate in the clamping position;
   when the pedal part is stepped down, the trigger paddle in the parking position is capable of rotating to the non-parking position, which is capable of driving the parking pull rod to pull the parking upper clamping plate to rotate and to be separated from the parking lower clamping plate in the clamping position; and
   wherein there are two parking positions, including a first parking position and a second parking position, wherein the first parking position is located below the non-parking position, and the second parking position is located above the non-parking position.

2. The parking mechanism of the riding lawn mower according to claim 1, wherein the parking trigger is provided with a first fixing ring and a second fixing ring in a circumferential direction, the parking pull rod comprises a first pull rod and a second pull rod with different lengths; when the parking position is the first parking position, the parking pull rod is the first pull rod, an upper end of the first pull rod is inserted into the first fixing ring, a lower end of the first pull rod is connected with the parking upper clamping plate; when the parking position is the second parking position, the parking pull rod is the second pull rod, an upper end of the second pull rod is inserted into the second fixing ring, and a lower end of the second pull rod is connected with the parking upper clamping plate.

3. The parking mechanism of the riding lawn mower according to claim 2, wherein the length of the first pull rod is longer than that of the second pull rod.

4. The parking mechanism of the riding lawn mower according to claim 3, wherein the parking trigger comprises an arc-shaped outer guard plate, an inner ring and a connecting strip provided between the concave surface of the outer guard plate and the inner ring, the inner ring is capable of being sleeved on the rotating shaft, and the trigger paddle is provided on the convex surface of the outer guard plate.

5. The parking mechanism of the riding lawn mower according to claim 4, wherein the first fixing ring is provided on the connecting strip.

6. The parking mechanism of the riding lawn mower according to claim 4, wherein a supporting strip is further provided on the inner ring at the position opposite to the connecting strip, and the second fixing ring is provided on the supporting strip.

7. The parking mechanism of the riding lawn mower according to claim 4, wherein the trigger assembly further comprises a parking toothed plate, the parking toothed plate comprises a side plate and a horizontal tube perpendicular to the side plate, the horizontal tube is the rotating shaft of the parking trigger, the inner ring is sleeved on the horizontal tube, and a damping ring is provided between the inner ring and the horizontal tube.

8. The parking mechanism of the riding lawn mower according to claim 7, further comprising a trigger assembly mounting frame, wherein the trigger assembly mounting frame is provided with a mounting groove, the parking trigger and the parking toothed plate are provided in the mounting groove, the parking toothed plate is fixed on the trigger assembly mounting frame, and the parking trigger is rotatably connected with the parking toothed plate.

9. A riding lawn mower, comprising the parking mechanism of the riding lawn mower according to claim 1.

* * * * *